(12) United States Patent
Lee

(10) Patent No.: US 7,761,297 B2
(45) Date of Patent: Jul. 20, 2010

(54) SYSTEM AND METHOD FOR MULTI-LINGUAL SPEECH RECOGNITION

(75) Inventor: Yun-Wen Lee, Taipei (TW)

(73) Assignee: Delta Electronics, Inc., Taoyuan Sien (TW)

( * ) Notice: Subject to any disclaimer, the term of this patent is extended or adjusted under 35 U.S.C. 154(b) by 1372 days.

(21) Appl. No.: 10/779,764

(22) Filed: Feb. 18, 2004

(65) Prior Publication Data
US 2004/0204942 A1 Oct. 14, 2004

(30) Foreign Application Priority Data
Apr. 10, 2003 (TW) ............... 92108216 A

(51) Int. Cl.
G10L 15/04 (2006.01)
G06F 17/20 (2006.01)

(52) U.S. Cl. ............... 704/252; 704/8; 704/10; 704/E15.02

(58) Field of Classification Search ......... 704/252, 704/254, 255
See application file for complete search history.

(56) References Cited

U.S. PATENT DOCUMENTS

| | | | | | |
|---|---|---|---|---|---|
| 4,882,759 | A | * | 11/1989 | Bahl et al. | 704/243 |
| 5,835,888 | A | * | 11/1998 | Kanevsky et al. | 704/9 |
| 5,897,617 | A | * | 4/1999 | Collier | 704/260 |
| 6,076,056 | A | * | 6/2000 | Huang et al. | 704/254 |
| 6,085,160 | A | * | 7/2000 | D'hoore et al. | 704/256.2 |
| 6,912,499 | B1 | * | 6/2005 | Sabourin et al. | 704/243 |
| 6,928,404 | B1 | * | 8/2005 | Gopalakrishnan et al. | 704/10 |
| 6,999,925 | B2 | * | 2/2006 | Fischer et al. | 704/243 |
| 7,149,688 | B2 | * | 12/2006 | Schalkwyk | 704/255 |
| 7,295,979 | B2 | * | 11/2007 | Neti et al. | 704/243 |
| 2002/0035469 | A1 | * | 3/2002 | Holzapfel | 704/211 |
| 2002/0040296 | A1 | * | 4/2002 | Kienappel | 704/220 |
| 2004/0088163 | A1 | * | 5/2004 | Schalkwyk | 704/251 |

OTHER PUBLICATIONS

Waibel, "Interactive Translation of Conversational Speech", IEEE Computer, Jul. 1996, vol. 29, issue 7, pp. 41-48.*
L. Manzara and D.R. Hill, "DEGAS: a System for Rule Based Diphone Speech Synthesis." ICSLP 92, Banff, Oct. 12-16, 1992.*
Building voices in the Festival speech synthesis system. http://festvox.org—Black, Lenzo—2000.*
J. Kohler, "Multi-lingual phoneme recognition exploiting acoustic-phonetic similarities of sounds," in Proc. ICASSP, pp. 2195-2198, 1996.*
Boeffard, O., Miclet, S. & White, S. (1992). Automatic generation of optimized unit dictionaries for text-to-speech synthesis. Proceedings on the International Conference on Speech and Language Processing'92, Banff, pp. 1211-1214.*
T. Holter and T. Svendsen, "Incorporation of linguistic knowledge and automatic baseform generation in acoustic subword unit based speech recognition," in Proc. Eur. Conf. Speech Communication Technology (EUROSPEECH), 1997, pp. 1159-1162.*
T. Holter and T. Svendsen, "Combined optimization of baseforms and model parameters in speech recognition based on acoustic subword units," in Proc. IEEE Workshop Automatic Speech Recognition, 1997, pp. 199-206.*

(Continued)

*Primary Examiner*—Talivaldis I Smits
*Assistant Examiner*—Greg A Borsetti
(74) *Attorney, Agent, or Firm*—Birch, Stewart, Kolasch & Birch, LLP

(57) ABSTRACT

A system for multi-lingual speech recognition. The inventive system includes a speech modeling engine, a speech search engine, and a decision reaction engine. The speech modeling engine receives and transfers a mixed multi-lingual speech signal into speech features. The speech search engine locates and compares candidate data sets. The decision reaction engine selects resulting speech models from the candidate speech models and generates a speech command.

8 Claims, 5 Drawing Sheets

| Speech | Mapping |
|---|---|
| c:z | e:ch, e:th |
| c:zcl | X |
| c:ing | e:ih e:ng |
| c:ch | c:c |

OTHER PUBLICATIONS

Schwartz, R., Chow, Y., Kimball, O., Roucos, S., Krasner, M., and Makhoul, J., "Context-Dependent Modeling for Acoustic-Phonetic Recognition of Continuous Speech". in: IEEE International Conference on Acoustics, Speech, and Signal Processing 1985, pp. 1205-1208.*

Glass, J., J. Chang~ and M. McCandless. (1996) "A Probabilistic Framework for Feature-based Speech Recognition," Proc. ICSLP 'Y6, Philadelphia, PA, pp. 2277-2280.*

Bonaventura, P., Gallocchio, F., Micca, G., 1997. Multilingual speech recognition for flexible vocabularies. In: Proceedings Eurospeech'97, pp. 355-358.*

J. J-X Wu et al, "Modeling context-dependent phonetic units in a continuous speech recognition system for Mandarin Chinese", Proc. ICSLP96, pp. 2281-2284, Philadelphia, 1996.*

L. F. Lamel and J. -L. Gauvain, "Cross-lingual experiments with phone recognition," in Proc. IEEE ICASSP-93 (Minneapolis, MN), Apr. 1993, pp. 507-510, vol. 2.*

Altosaar et al. (1989) "A Knowledge-based Approach to Unlimited Vocabulary Speech Recognition for the Finiish Language," Proc. Eurospeech-89, pp. 613-616.*

* cited by examiner

| Speech | Mapping |
|---|---|
| c:z | e:ch,e:th |
| c:zcl | X |
| c:ing | e:ih e:ng |
| c:ch | c:c |

SYSTEM AND METHOD FOR MULTI-LINGUAL SPEECH RECOGNITION

This Non-provisional application claims priority under 35 U.S.C. §119(a) on Patent Application No. 092108216 filed in TAIWAN on Apr. 10, 2003, the entire contents of which are hereby incorporated by reference.

BACKGROUND OF THE INVENTION

1. Field of the Invention

The present invention relates to speech recognition technology and in particular to a system and method for recognizing multiple languages in a single speech signal.

2. Description of the Related Art

Currently, the main methods of recognition of a multi-lingual speech signal are described as follows. A recognition system constructed by several independent uni-lingual speech recognition subsystems must select a language desired by users or computers in advance and designate a uni-lingual speech recognition subsystem to recognize speech signals. Obviously, the mentioned method only can deal with one language at one time, being unable to handle various languages simultaneously. Strictly speaking, although the mentioned method includes different speech recognition subsystems, it does not provide multi-lingual speech recognition functionality.

A second method utilizes one language to simulate other languages. That is, the phonetic transcriptions of one main language are utilized to simulate the pronunciation of other languages. For example, if Chinese is selected as the main language, then phonetic transcriptions of Chinese will be used to simulate other languages, such as English or Japanese. As an example, "DVD" in English might be simulated by "dil bil dil" in Chinese. The second method can partially resolve multi-lingual speech recognition problems. However, one difficulty of the second method is that many parts of speech cannot be simulated. Thus, an incomplete simulation may affect the whole recognition result. To give an example, the "V" in English cannot be simulated properly by Chinese phonetic transcriptions, whereby improper simulation will affect the whole recognition result.

The third method utilizes global phonemes to label the speech of all languages and then refers to a decision tree to classify and recognize the labeled speech. The third method can avoid the mentioned incomplete simulation problem, however, if there is a large amount of vocabulary, interference among different languages will be significant, degrading the recognition result.

SUMMARY OF THE INVENTION

Accordingly, an object of the invention is to utilize diphone models to recognize a mixed multi-lingual speech signal.

The inventive method adopts cross-lingual diphone models to recognize the parts of the speech signal containing multiple languages and uni-lingual diphone models to recognize parts of containing only one. That is, only the parts transitioning between languages will be recognized by cross-lingual diphone models, avoiding the interference of different languages.

A complete speech recognition system must be trained by a large amount of speech data. Another object of the invention is to provide an initial integration method, applied in the initial establishment of a speech recognition system. The initial integration method integrates several different independent trained diphone speech recognition systems into one multi-lingual speech recognition system, resolving initial establishment problems of the speech recognition system.

To achieve the foregoing objects, the present invention provides a system for multi-lingual speech recognition. The inventive system includes a speech modeling engine, a speech search engine, and a decision reaction engine. The speech modeling engine receives and transfers a mixed multi-lingual speech signal into speech features. The speech search engine locates and compares candidate data sets to fond match probability for candidate speech models. The decision reaction engine selects the candidate speech commands according to the match probability and generates a speech command.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
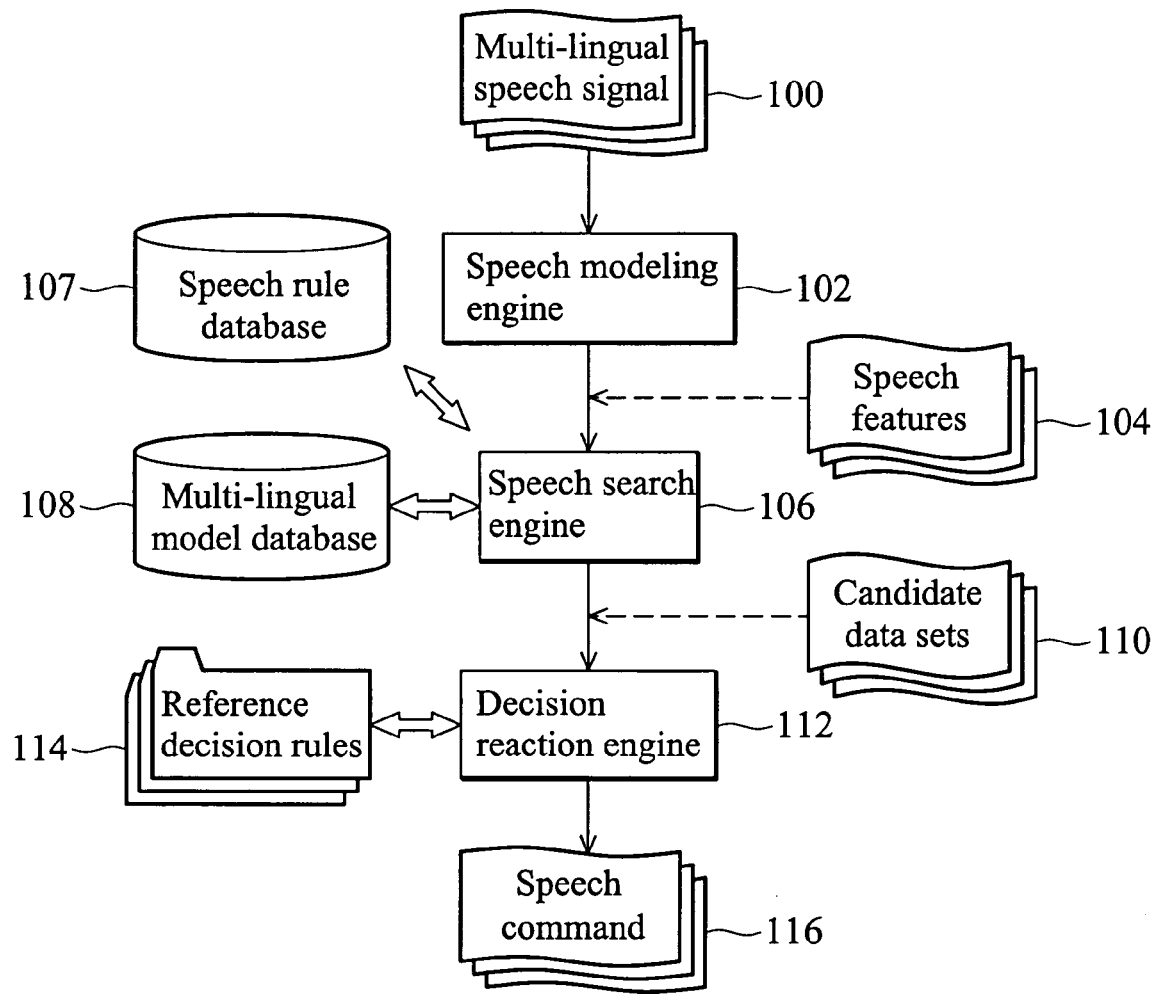
FIG. 1 is a diagram of the system for multi-lingual speech recognition according to the present invention.

As summarized above, the present invention provides a system for multi-lingual speech recognition, including a speech modeling engine, a speech search engine, and a decision reaction engine.

The speech modeling engine receives a mixed multi-lingual speech signal, converts the multi-lingual speech signal into speech features.

The speech search engine receives the speech features, locating and comparing candidate data sets referring to a multi-lingual model database. Each of the candidate data sets corresponds to the speech features and has several candidate speech models with match probability. The speech models are characterized by diphone models. The speech search engine may refer to connecting sequences of the speech features and a speech rule database. The connecting sequences may follow some specific connection rules in particular application, such as ID or address.

The multi-lingual model database includes multi-lingual context-speech mapping data and multi-lingual anti-models.

The provided system also includes a multi-lingual baseform generation engine and a cross-lingual diphone model generation engine to generate the multi-lingual context-speech mapping data. The multi-lingual baseform mapping engine compares multi-lingual query commands to obtain multi-lingual baseforms. The cross-lingual diphone model generation engine selects and combines the multi-lingual baseforms into the multi-lingual context-speech mapping data.

The disclosed system further includes certain uni-lingual anti-model engines and an anti-model combination engine to generate the multi-lingual anti-models. The uni-lingual anti-model generation engines receive multi-lingual query commands to normalized and generate all uni-lingual anti-models for all needed languages. The anti-model combination engine combines the uni-lingual anti-models to generate the multi-lingual anti-models.

The decision reaction engine, coupled to the speech search engine, selects resulting speech models corresponding to the speech features from the candidate speech models according to the match probability and generates a speech command. Then, the decision reaction engine can produce reactions according to the recognized speech command.

Furthermore, the invention discloses a method for multi-lingual speech recognition.

First, the method transfers a mixed multi-lingual speech signal into speech features.

Next, the method locates and compares candidate data sets corresponding to the speech features by referring to a multi-lingual model database. Each of the candidate data sets has candidate speech diphone models with corresponding match probability. Locating and comparison may be accomplished by referring to other rules or databases, such as the connecting sequences of the speech models or a speech rule database.

The multi-lingual model database includes multi-lingual context-speech mapping data and multi-lingual anti-models.

The multi-lingual context-speech mapping data is established by following generation steps. First, the multi-lingual query commands are compared to obtain multi-lingual baseforms. The multi-lingual baseforms are then selected and combined into the multi-lingual context-speech mapping data. For instance, the mentioned generation steps can execute some detailed changes according to pronunciation. Nevertheless, the detailed changes can be ignored in simpler recognition systems.

The above selection and combination is accomplished by certain steps. First, the left contexts of the multi-lingual baseforms are fixed, and the right contexts of the multi-lingual baseforms are mapped to obtain a mapping result. If the mapping fails, then fix the right contexts and map the left contexts of the multi-lingual baseforms to obtain the mapping result. Finally, the multi-lingual context-speech mapping data is obtained according to the mapping result.

The multi-lingual anti-models are established by some generation steps. First, multi-lingual query commands corresponding to certain languages are received and normalized to generate uni-lingual anti-models. The uni-lingual anti-models are then calculated to generate the multi-lingual anti-model.

Finally, the inventive method selects resulting speech models corresponding to the speech features from the candidate speech models according to the match probability and generates a speech command. Here, again the decision reaction engine can react to the recognized speech command.

FIG. 1 is a diagram of the system for multi-lingual speech recognition according to the present invention. A system for multi-lingual speech recognition is provided. The disclosed system includes a speech modeling engine 102, a speech search engine 106, and a decision reaction engine 112.

The speech modeling engine 102 receives a mixed multi-lingual speech signal 100, transfers the multi-lingual speech signal 100 into speech features 104.

The speech search engine 106 receives the speech features 104, and locates and compares candidate data sets 110 corresponding to the speech features 104, referring to a multi-lingual model database 108. Each of the candidate data sets 110 has several candidate speech models with corresponding match probability. The locating and comparison may also refer to other rules and databases, such as a language rule database and mixed multi-lingual query commands strings. The language rule model database is established by language rules of one particular field. The mixed multi-lingual query commands strings are the general terms in one particular field. The function of the mentioned reference rules and databases is to enhance the recognition rate. The speech search engine 106 further refers the connecting sequences of the speech models and a speech rule database 107.

The decision reaction engine 112 selects resulting speech models corresponding to the speech features from the candidate speech models according to the match probability and other reference decision rules 114. The decision reaction engine 112 then generates a speech command 116. The decision reaction engine 112 produces the reaction according to the recognized speech command 116.

A threshold can be designed in the reference decision rules 114 to determine whether the speech command is correctly recognized. Thus, erroneous recognized commands can be filtered, and might request reconfirm, avoiding repercussion. Otherwise, the reference decision rules 114 can be designed to accept the entire recognition result without verification. The reactions may be a signal, a light, or a voice notification, prompting repeat input or an action for remote control.

The multi-lingual model database 108 comprises multi-lingual context-speech mapping data and multi-lingual anti-models.

Figure 2:
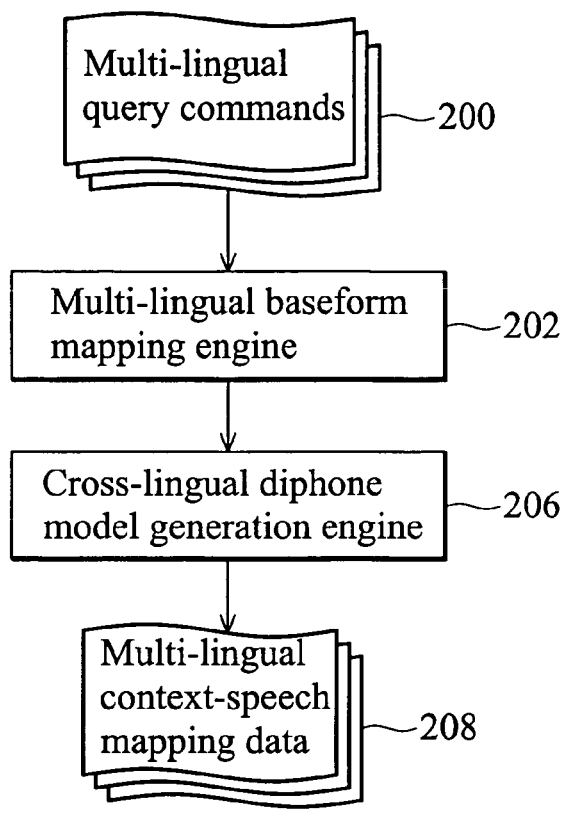
FIG. 2 is a diagram of establishment of the multi-lingual context-speech mapping data according to the present invention.

FIG. 2 is a diagram of establishment of the multi-lingual context-speech mapping data according to the present invention. The present invention further comprises a multi-lingual baseform mapping engine 202 and a cross-lingual diphone model generation engine 206.

The multi-lingual baseform mapping engine 202 compares multi-lingual query commands 200 to obtain multi-lingual baseforms. The cross-lingual diphone model generation engine 206 selects and combines the multi-lingual baseforms into the multi-lingual context-speech mapping data 208.

The cross-lingual diphone model generation engine 206 accomplishes the selection and combination by several steps. First, the left contexts of the multi-lingual baseforms are fixed, and the right contexts of the multi-lingual baseforms are mapped to obtain a mapping result. Next, fix the right context and the left contexts are mapped to obtain the mapping result if right context mapping fails. Finally, multi-lingual context-speech mapping data is obtained according to the mapping result.

Figures 4, 5:
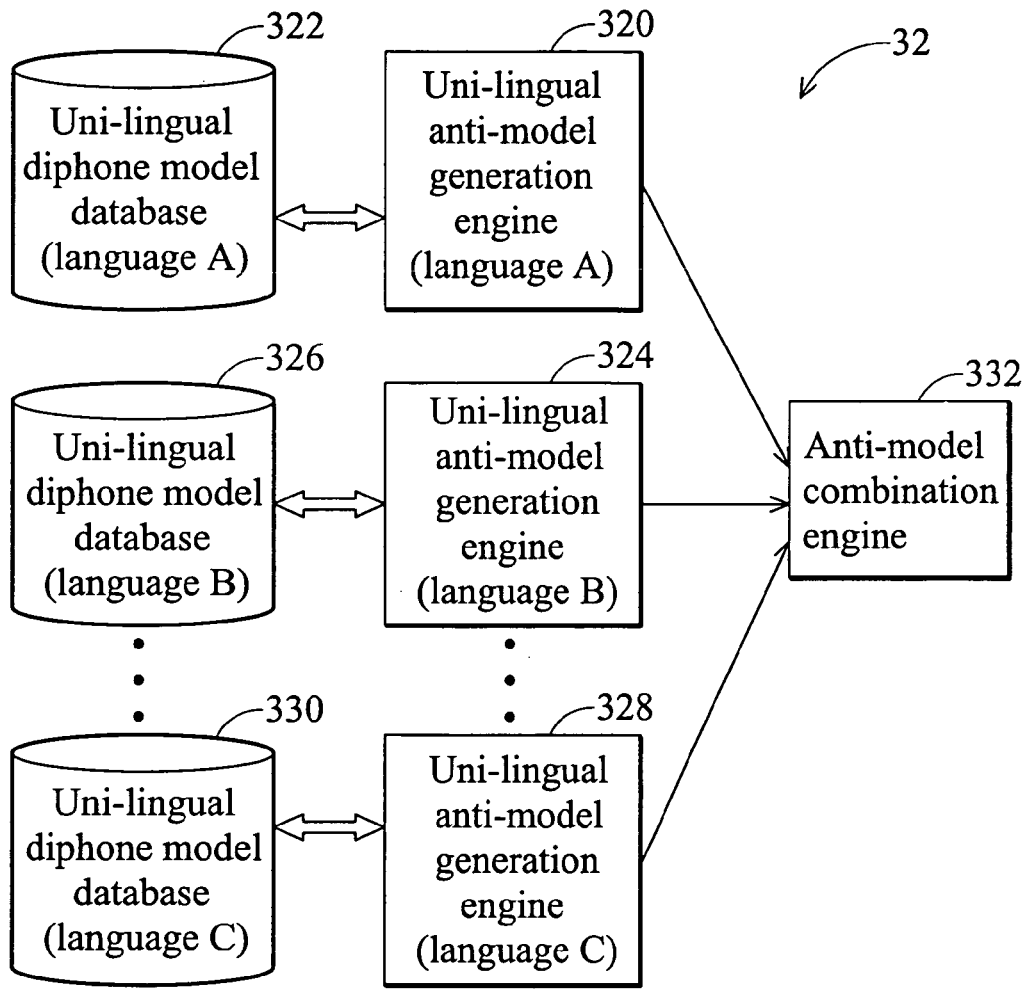
FIG. 4 is a detailed diagram of establishment of the multi-lingual anti-models according to the present invention.
FIG. 5 is a diagram illustrating cross-lingual data of the present invention according to one embodiment.

FIG. 5 is a diagram illustrating cross-lingual data of the present invention according to one embodiment. The "c" illustrated in FIG. 5 represents "Chinese" and the "e" represents "English." As shown in the first row of FIG. 5, the "z" in Chinese cannot generate the optimal simulated pronunciation. By applying the provided method, the "z" in Chinese can find diphone models "ch" or "th" for simulation, as shown in FIG. 5. In addition, the "zcl" in Chinese cannot generate the optimal mapping simulation, thus there is no mapping result, as shown in the second row in FIG. 5. The "ing" in Chinese maps to the concatenation of "ih" and "ng" in English, as shown in the third row of FIG. 5.

Figure 3:
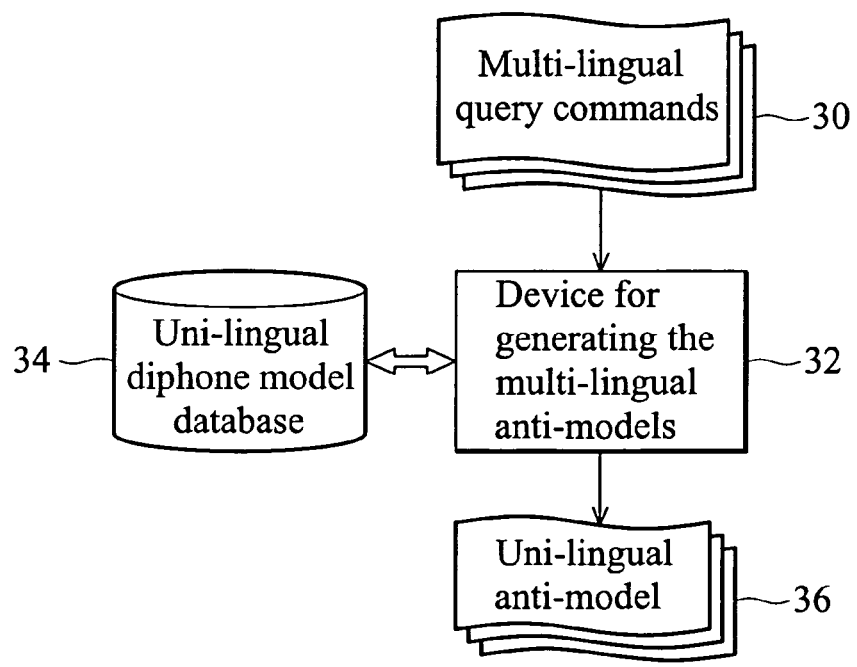
FIG. 3 is a diagram of establishment of the multi-lingual anti-models according to the present invention.

FIG. 3 is a diagram of establishment of the multi-lingual anti-models according to the present invention. The inventive system may include a device 32 generating the multi-lingual anti-models. The device 32 receives multi-lingual query commands 30 to normalize and generate all needed uni-lingual anti-model 36.

FIG. 4 is a detailed diagram of establishment of the multi-lingual anti-models according to the present invention. The device 32 comprises several uni-lingual anti-model generation engines 320, 324, 328 and an anti-model combination engine 332. The uni-lingual anti-model generation engines 320, 324, 328 receive multi-lingual query commands 30 in FIG. 3. The multi-lingual query commands 30 correspond to specific languages. The uni-lingual anti-model generation engines 320, 324, 328 normalizes specific uni-lingual diphone model database 322, 326, 330, to generate their uni-lingual anti-models. Each uni-lingual anti-model corresponds to one language. The anti-model combination engine 332, coupled to the uni-lingual anti-model generation engines 320, 324, 328, calculates the uni-lingual anti-models to generate the multi-lingual anti-models 36 in FIG. 3.

For example, the uni-lingual anti-model generation engine (language A) 320 may refer the uni-lingual diphone model database (language A) 322 to generate an uni-lingual anti-model of language A. The uni-lingual anti-model generation engine (language B) 324 may refer the uni-lingual diphone model database (language B) 326 to generate uni-lingual anti-model of language B. Similarly, the uni-lingual anti-model generation engine (language C) 328 may refer the uni-lingual diphone model database (language C) 330 to generate uni-lingual anti-model of language C. The anti-model combination engine 332 then receives the uni-lingual anti-models of languages A, B and C and calculates them into the multi-lingual anti-model 36.

The uni-lingual anti-model generation engines 320, 324, 328 adopt the following formulas (1) and (2) for normalization.

$$p = \sum_{k=1} C_k N_{(o,\mu_k,\sigma_k)} \quad (1)$$

$$\log P = \log P - \log P_{anti} \quad (2)$$

If the applied speech recognition system is completely trained by a mixed multi-lingual database, the system includes the trained multi-lingual diphone models. Thus, the cross-lingual diphone model generation engine 206 shown in FIG. 2 and the normalization shown in FIG. 4 are not necessary. If the applied system is integrated by multiple independent speech recognition sub-systems, the normalization shown in FIG. 4 is required.

Figure 6:
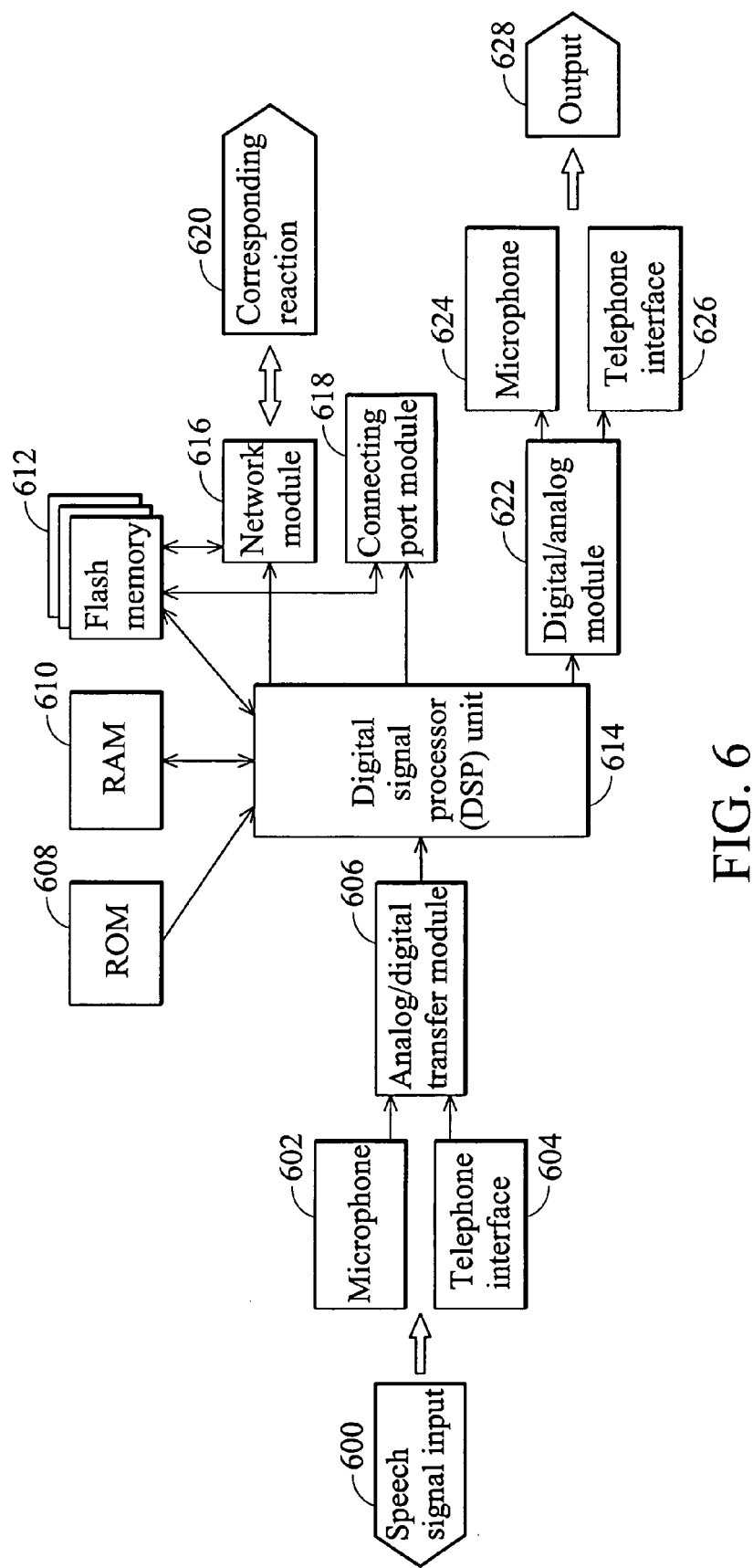
FIG. 6 is a diagram of an applied example of the present invention according to one embodiment.

FIG. 6 is a diagram of an applied example of the present invention according to one embodiment. Users connect to one speech recognition system through network module 616 or connecting port module 618, by which they can define desired recognition rules, such as address, ID number, or license plate number. A speech signal input 600 can be input via microphone 602 or telephone interface 604.

Next, the analog/digital transfer module 606 converts the speech signal input 600 into a digital signal. The programs are stored in ROM 608, and downloaded to RAM 610 and flash memory 612 for execution at run time. The digital signal processor (DSP) unit 614 processes, controls, and recognizes data. Some fixed data, such as network protocol or boot programs, can be stored in ROM 608. The varied data, such as transfer tables or speech probability models, can be stored in flash memory 612. The DSP unit 614 loads the speech recognition system into RAM 610 for data recognition.

Finally, the recognition result is sent to the digital/analog module 622 for converting into analog signals. The converted analog signals could be output as an audio signal or by telephone interface 626. Moreover, the corresponding reaction 620 for the remote object, such as program upgrade or update, can be executed through network module 616 or connecting port module 618.

Figure 7:
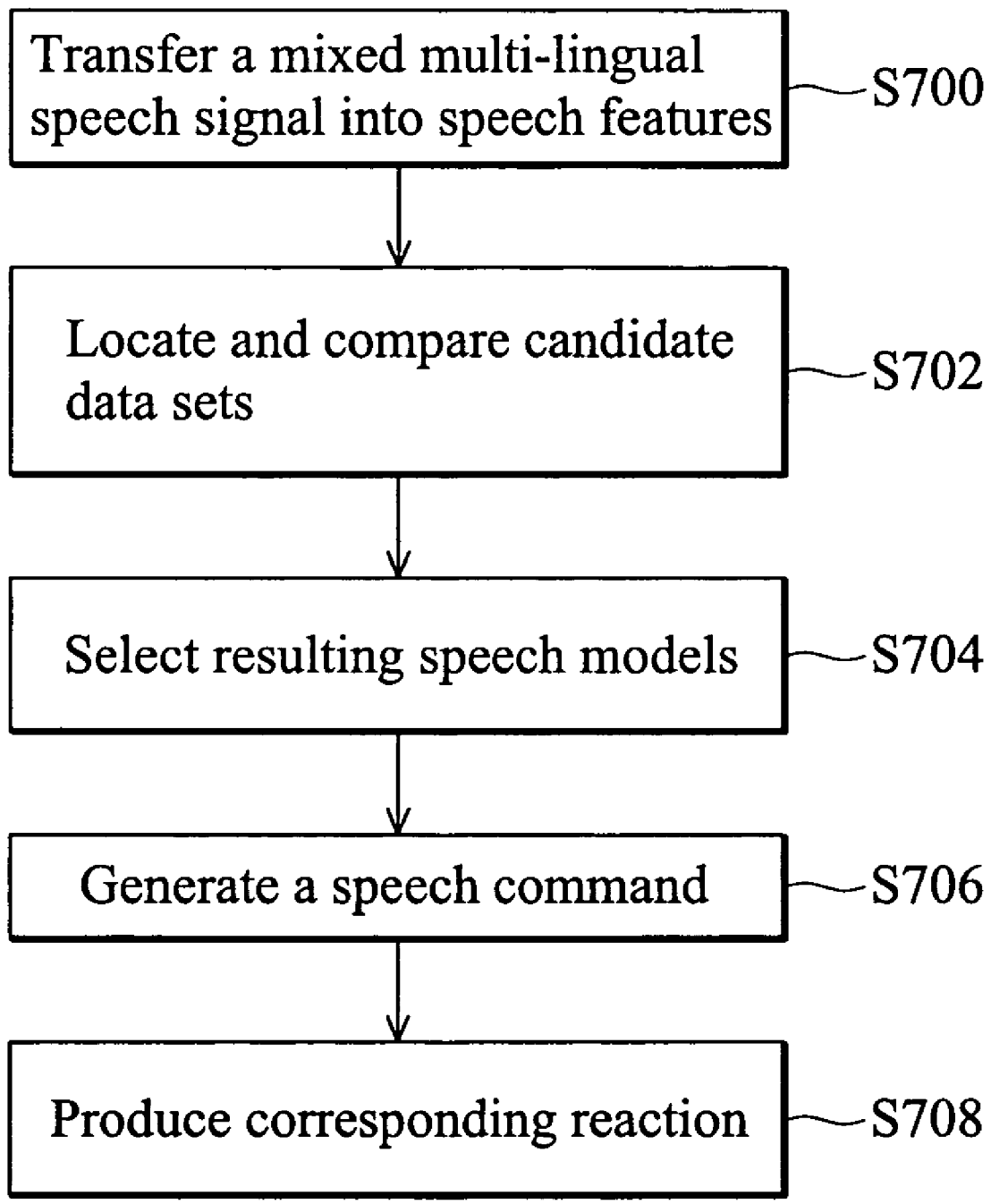
FIG. 7 is a flowchart of the method for multi-lingual speech recognition according to the present invention.

Furthermore, the invention discloses a recognition method for multi-lingual speech recognition. FIG. 7 is a flowchart of the method for multi-lingual speech recognition according to the present invention.

First, the method transfers a mixed multi-lingual speech signal into speech features.

Next, the method locates and compares candidate data sets referring to a multi-lingual model database. Each of the candidate data sets corresponds to the speech features and has candidate speech models with corresponding match probability (step S702). The multi-lingual model database comprises multi-lingual context-speech mapping data and multi-lingual anti-models.

The multi-lingual context-speech mapping data is established by a multi-lingual modeling procedure. The multi-lingual modeling procedure first compares multi-lingual query commands to obtain multi-lingual baseforms. The multi-lingual modeling procedure then selects and combines the multi-lingual baseforms into multi-lingual context-speech mapping data. Selection and combination are accomplished by certain steps. First, the left contexts of the multi-lingual baseforms are fixed, and the right contexts of the multi-lingual baseforms are mapped to obtain a mapping result. Next, fix the right context and the left contexts are mapped to obtain the mapping result if the right context mapping fails. Finally, the multi-lingual context-speech mapping data is obtained according to the mapping result.

The multi-lingual anti-models are established by a multi-lingual anti-model generation procedure. The multi-lingual anti-model generation procedure first receives multi-lingual query commands to normalizes and generate all uni-lingual anti-models. The multi-lingual anti-model generation procedure then combines the uni-lingual anti-models to generate the multi-lingual anti-model.

Finally, the method selects resulting speech models corresponding to the speech features from the candidate speech models according to the match probability (step S704), and generates a speech command (step S706). The corresponding reaction may be produced according to the recognized speech command (step S708).

Thus, the system and method provided by the present invention can implement multi-lingual recognition functions to recognize multi-lingual speech signals and produce speech commands, achieving the objects of the invention. Particularly, the present invention can be applied in a speech recognition system with a large amount of vocabulary and cross-language terms, providing significant improvement over the conventional method.

It will be appreciated from the foregoing description that the system and method described herein provide a dynamic and robust solution to mixed multi-lingual speech recognition problems. If, for example, the desired language input to the system changes, the system and method of the present invention can be revised accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for multi-lingual speech recognition, comprising:
   a digital signal processing unit;
   a speech modeling system, receiving and transferring a mixed multi-lingual speech signal into a plurality of speech features;
   a multi-lingual baseform mapping engine, comparing a plurality of multi-lingual query commands to obtain a plurality of multi-lingual baseforms;
   a cross-lingual diphone model generation engine executed by the digital signal processing unit, coupled to the multi-lingual baseform mapping engine, selecting and combining the multi-lingual baseforms, further comprising:
      fixing left contexts of the multi-lingual baseforms and mapping right contexts of the multi-lingual baseforms to obtain a mapping result;
      fixing right context and mapping the left contexts of the multi-lingual baseforms to obtain the mapping result if the contexts of the multi-lingual baseforms mapping fails; and
      obtaining the multi-lingual context-speech mapping data according to the mapping result;
      storing the multi-lingual context-speech mapping data in a multi-lingual model database;
   a speech search engine, coupled to the speech modeling engine, receiving the speech features, and locating and comparing a plurality of candidate data sets corresponding to the speech features according to the multi-lingual model database to find match probability of a plurality of candidate speech models of the candidate data sets; and
   a decision reaction engine, coupled to the speech search engine, selecting a plurality of resulting speech models corresponding to the speech features according to the match probability from the candidate speech models to generate a speech command.

2. The system as claimed in claim 1, wherein the multi-lingual model database comprises a plurality of multi-lingual anti-models.

3. The system as claimed in claim 2, further comprising:
   at least one uni-lingual anti-model generation engine, receiving a plurality of multi-lingual query commands to generate a plurality of uni-lingual anti-models corresponding to specific languages; and
   an anti-model combination engine, coupled to the uni-lingual anti-model generation engine, calculating the uni-lingual anti-models to generate the multi-lingual anti-models.

4. The system as claimed in claim 1, wherein the speech search engine locates and compares the candidate data sets, further referring the connecting sequences of the speech features and a speech rule database.

5. A method for multi-lingual speech recognition, comprising the steps of:
   performing the following steps by a digital signal processing system;
   transferring a mixed multi-lingual speech signal into a plurality of speech features;
   comparing a plurality of multi-lingual query commands to obtain a plurality of multi-lingual baseforms;
   selecting and combining the multi-lingual baseforms, comprising:
      fixing left contexts of the multi-lingual baseforms and mapping right contexts of the multi-lingual baseforms to obtain a mapping result;
      fixing right context and mapping the left contexts of the multi-lingual baseforms to obtain the mapping result if the right contexts of the multi-lingual baseforms mapping fails; and
      obtaining the multi-lingual context-speech mapping data according to the mapping result;
      storing the multi-lingual context-speech mapping data in a multi-lingual model database;
   locating and comparing a plurality of candidate data sets corresponding to the speech features according to the multi-lingual model database to find match probability of a plurality of candidate speech models of the candidate data sets; and
   selecting a plurality of resulting speech models corresponding to the speech features from the candidate speech models according to the match probability to generate a speech command.

6. The method as claimed in claim 5, wherein the multi-lingual model database comprises a plurality of multi-lingual anti-models.

7. The method as claimed in claim 6, further comprising the steps of:
   receiving a plurality of multi-lingual query commands corresponding to specific languages and generate a plurality of uni-lingual anti-models; and
   combining the uni-lingual anti-models to generate the multi-lingual anti-model.

8. The method as claimed in claim 5, wherein locating and comparison of the candidate data sets further refers the connecting sequences of the speech features and a speech rule database.

* * * * *